(12) United States Patent
Kim et al.

(10) Patent No.: US 8,345,429 B2
(45) Date of Patent: Jan. 1, 2013

(54) MOBILE TERMINAL HAVING DETACHABLE SUB-MODULE

(75) Inventors: Yu Guen Kim, Gihung-gu (KR); Sang Min Hyun, Seoul (KR); Seog Guen Kim, Seoul (KR); Yun Su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 12/704,927

(22) Filed: Feb. 12, 2010

(65) Prior Publication Data

US 2010/0208434 A1    Aug. 19, 2010

(30) Foreign Application Priority Data

Feb. 18, 2009    (KR) .................. 10-2009-0013319

(51) Int. Cl.
*H05K 7/00* (2006.01)
(52) U.S. Cl. ........................................................ 361/729
(58) Field of Classification Search .................. 361/728, 361/729, 730, 679.55; 455/566, 566.2, 66.1, 455/575.1, 575.2, 575.3, 575.4, 575.5, 575.6
See application file for complete search history.

(56) References Cited

U.S. PATENT DOCUMENTS

| | | | | |
|---|---|---|---|---|
| 4,664,496 A * | 5/1987 | Shinoda et al. | ............... | 396/169 |
| 6,327,152 B1 * | 12/2001 | Saye | ............... | 361/732 |
| 6,349,040 B2 * | 2/2002 | Lefort | ............... | 361/814 |
| 6,707,490 B1 * | 3/2004 | Kido et al. | ............... | 348/211.14 |
| 6,794,798 B2 * | 9/2004 | Watanabe et al. | ............... | 310/334 |
| 7,163,294 B2 * | 1/2007 | Nambudiri et al. | ............... | 353/31 |
| 7,365,968 B2 * | 4/2008 | Chen et al. | ............... | 361/679.27 |
| 7,463,827 B2 * | 12/2008 | Horii et al. | ............... | 396/532 |
| 7,589,959 B2 * | 9/2009 | Ikeda | ............... | 361/679.21 |
| 7,885,061 B2 * | 2/2011 | Yang | ............... | 361/679.21 |
| 7,974,662 B2 * | 7/2011 | Tsai et al. | ............... | 455/575.1 |
| 2001/0009498 A1 * | 7/2001 | Oross et al. | ............... | 361/681 |
| 2006/0044400 A1 * | 3/2006 | Lee | ............... | 348/207.99 |
| 2006/0291154 A1 * | 12/2006 | DiFonzo et al. | ............... | 361/683 |
| 2007/0019374 A1 * | 1/2007 | Springer et al. | ............... | 361/685 |
| 2007/0230098 A1 * | 10/2007 | Wu et al. | ............... | 361/683 |
| 2008/0167080 A1 * | 7/2008 | Su | ............... | 455/566 |
| 2008/0171581 A1 * | 7/2008 | Rhee et al. | ............... | 455/575.3 |
| 2008/0304222 A1 * | 12/2008 | Chen | ............... | 361/683 |
| 2008/0310094 A1 * | 12/2008 | Burns | ............... | 361/683 |
| 2009/0021903 A1 * | 1/2009 | Chen et al. | ............... | 361/683 |
| 2009/0098908 A1 * | 4/2009 | Silverbrook et al. | ....... | 455/556.1 |
| 2009/0111320 A1 * | 4/2009 | Johansson et al. | ............... | 439/466 |
| 2009/0111533 A1 * | 4/2009 | Johansson et al. | ......... | 455/575.1 |
| 2009/0244836 A1 * | 10/2009 | Leng et al. | ............... | 361/679.58 |
| 2009/0262494 A1 * | 10/2009 | Ikeda | ............... | 361/679.21 |
| 2010/0020476 A1 * | 1/2010 | Mangaroo et al. | ....... | 361/679.01 |

* cited by examiner

*Primary Examiner* — Lisa Lea Edmonds
*Assistant Examiner* — Xanthia C Cunningham
(74) *Attorney, Agent, or Firm* — H.C. Park & Associates, PLC

(57) ABSTRACT

A mobile terminal having a detachable sub-module is disclosed. The mobile terminal includes a sub-module having a sub-function configuration unit formed with parts for performing a function and a main terminal having a display unit at a front surface and a connection unit at a rear surface for coupling the sub-module to the main terminal. A magnet is installed at a side surface of the connection unit or the sub-module, and the sub-module is coupled to the main terminal or is detached from the main terminal through the magnet. Enhancement of the portability and function quality of mobile terminals that support various functions is achieved by coupling a sub-module for performing a function to the main terminal having a display unit that allows user interactivity with the mobile terminal.

23 Claims, 9 Drawing Sheets

MOBILE TERMINAL HAVING DETACHABLE SUB-MODULE

CROSS REFERENCE TO RELATED APPLICATION

This application claims priority from and the benefit of Korean Patent Application No. 10-2009-0013319, filed on Feb. 18, 2009, which is hereby incorporated by reference for all purposes as if fully set forth herein.

BACKGROUND OF THE INVENTION

1. Field of the Invention

Exemplary embodiments of the present invention relate to a mobile terminal and, more particularly, to a mobile terminal having a detachable sub-module.

2. Discussion of the Background

Generally, a mobile terminal is an electronic device for enabling a user to use a function such as wireless communication, network connection, and digital broadcasting reception almost regardless of time and location. Presently, mobile terminals perform various functions such as communication, document writing, game playing, photographing, digital broadcast reception, moving picture reproduction, and internet web browsing. However, mobile terminal sizes are decreasing, creating limitations in performing such various functions. For example, in order to support a photographing function, a mobile terminal has a camera unit with fewer pixels relative to a general digital camera and thus has limited resolution when photographing an image. When a higher resolution camera unit for supporting higher quality photography is mounted in a mobile terminal in order to overcome this limitation, the size of the mobile terminal increases, lessening the portability of the mobile terminal. In order to perform various functions using the mobile terminal, various function modules mounted within the mobile terminal are limited in performing the functions. Therefore, a mobile terminal that is portable while supporting various functions such as a camera function is desired.

SUMMARY OF THE INVENTION

Exemplary embodiments of the present invention provide a mobile terminal that is portable and supports various functions of the mobile terminal by coupling a sub-module that performs a function of the main terminal, which is equipped with a display unit.

Additional features of the invention will be set forth in the description which follows, and in part will be apparent from the description, or may be learned by practice of the invention.

Exemplary embodiments of the present invention disclose at least one sub-module comprising a sub-function configuration unit having parts to perform a function and a main terminal comprising a display unit on a front surface and a connection unit on a rear surface with the connection unit having a first feature adapted to detachably receive the sub-module.

Exemplary embodiments of the present invention also disclose a mobile terminal having a sub-module comprising a sub-function configuration unit comprising parts to perform a function and a main terminal comprising a display unit at a front surface of the main terminal and a connection unit at a rear surface of the main terminal, the connection unit to detachably couple the sub-module to the main terminal, wherein a magnet is installed at a side surface of the connection unit or the sub-module, and the magnet detachably couples the sub-module to the main terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF ILLUSTRATED EMBODIMENTS

Figure 1:
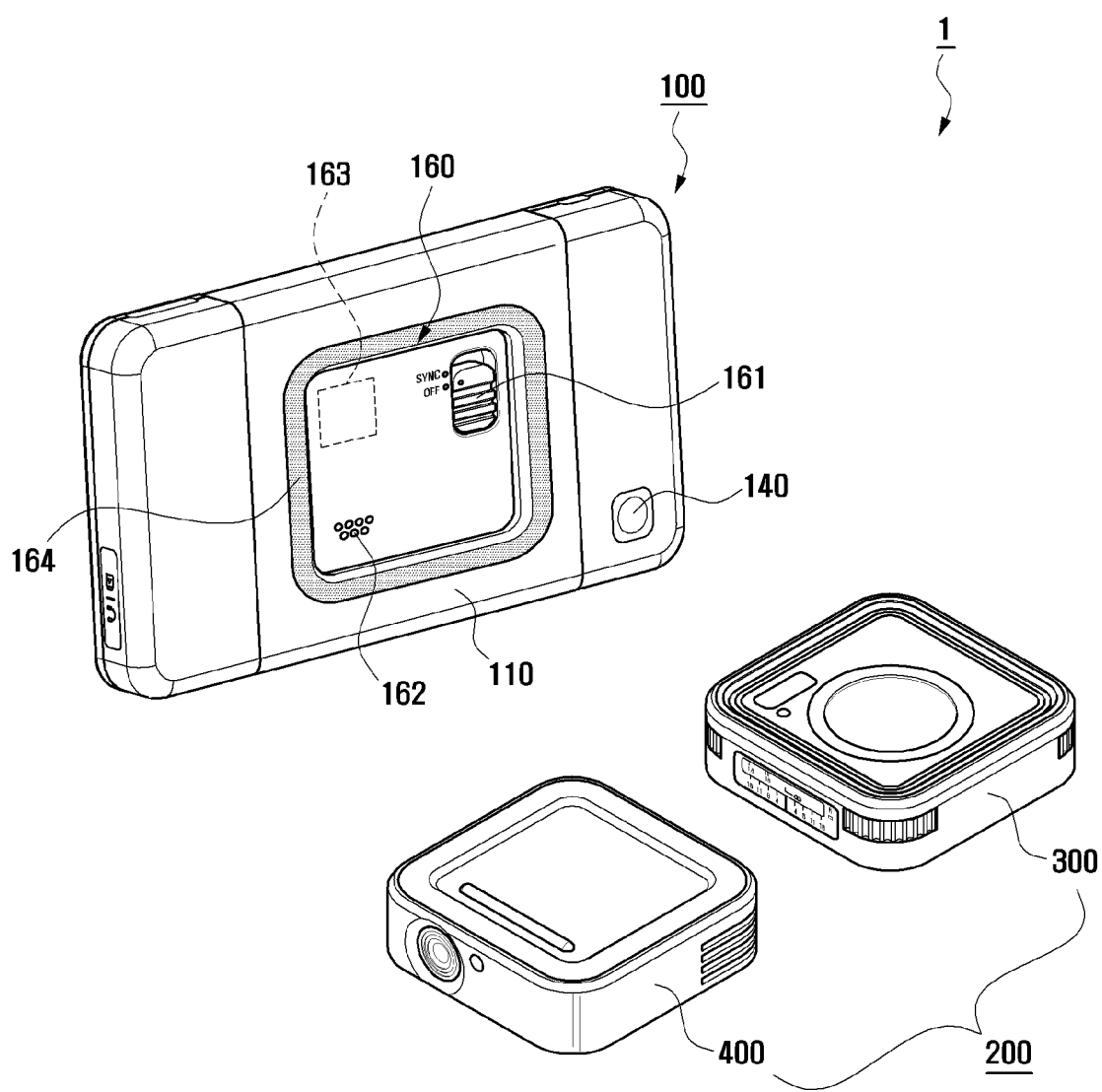
FIG. 1 is a perspective view showing a configuration of a mobile terminal having a detachable sub-module and two sub-modules according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element of layer, there are no intervening elements or layers present.

Prior to explaining exemplary embodiments of the present invention, relevant terminology will be defined for the description below. For convenience of description, a mobile terminal is described as a mobile communication terminal; however, the mobile terminal is not limited thereto, and the mobile terminal may be an information and communication device or a multimedia device such as a mobile communication terminal, mobile phone, personal digital assistant (PDA), smart phone, International Mobile Telecommunication 2000 (IMT-2000) terminal, code division multiple access (CDMA) terminal, wideband code division multiple access (WCDMA) terminal, Global System for Mobile Communication (GSM) terminal, general packet radio service (GPRS) terminal, enhanced data GSM environment (EDGE) terminal, universal mobile telecommunication service (UMTS) terminal, or digital broadcasting terminal, and applications thereof. Moreover, a sub-module is described as being detachably coupled to a main terminal of a mobile terminal. When an element is detachably coupled to another body, the element may be reversibly coupled to the other body and reversibly decoupled from that body, i.e., the two bodies are capable of repeated physical separation and reattachment to one another. Likewise the main terminal is described with a connection unit that detachably receives a sub-module. When an element detachably receives another body, the element may be reversibly coupled to the other body and reversibly decoupled from that body, i.e., the two bodies are capable of repeated physical separation and being re-coupled to one another.

Hereinafter, exemplary embodiments of the present invention are described in detail with reference to the accompanying drawings.

Figure 2A:
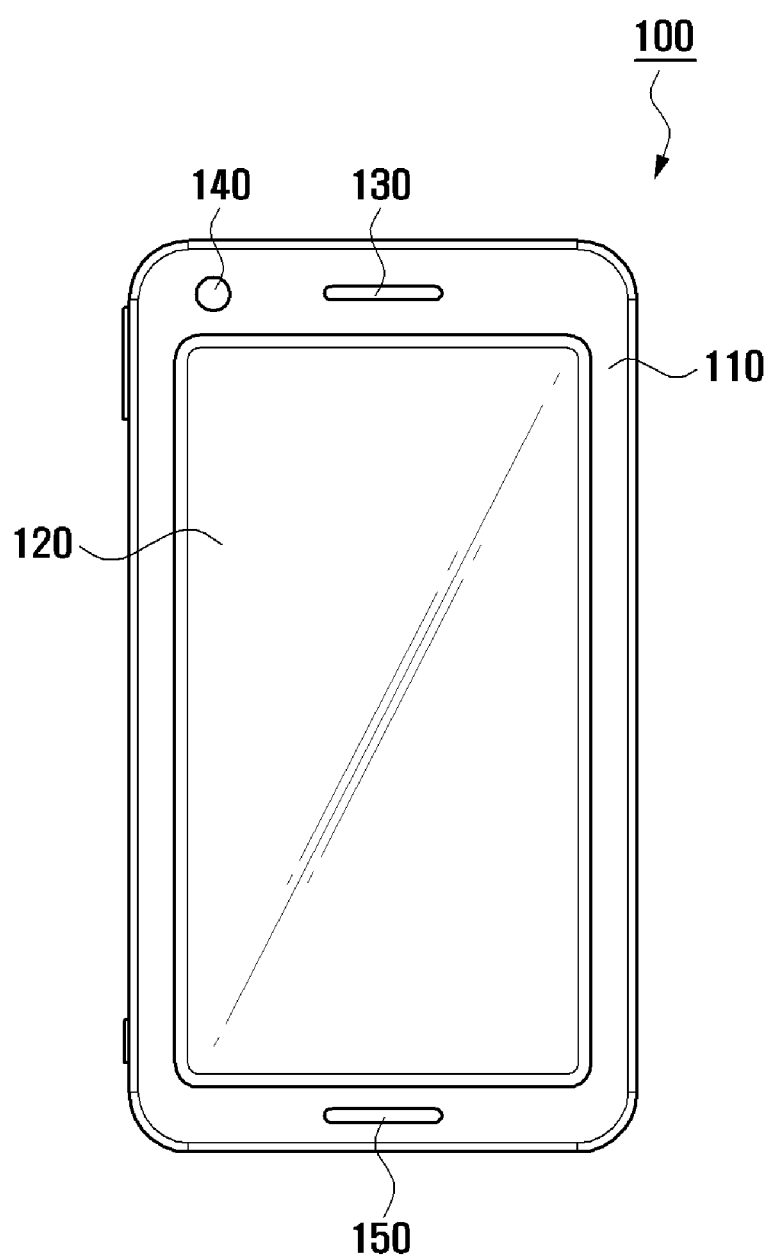
FIG. 2A and FIG. 2B show a front surface and a rear surface of a main terminal in the mobile terminal having a detachable sub-module.
Figure 2B:
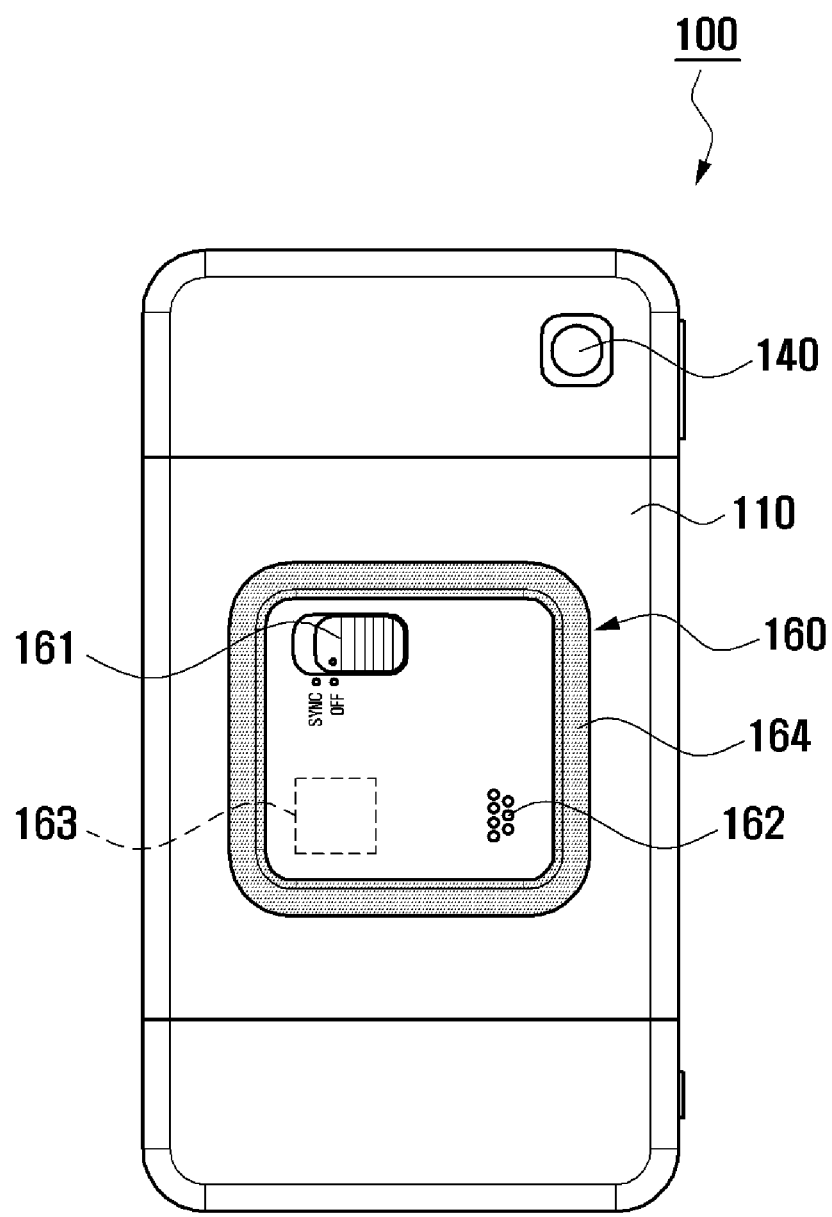

FIG. 1 is a perspective view showing a configuration of a mobile terminal 1 having a detachable sub-module 200 according to an exemplary embodiment of the present invention, and FIG. 2A and FIG. 2B are views showing a front surface and a rear surface, respectively of a main terminal 100 in the mobile terminal 1 having a detachable sub-module 200.

Figure 3:
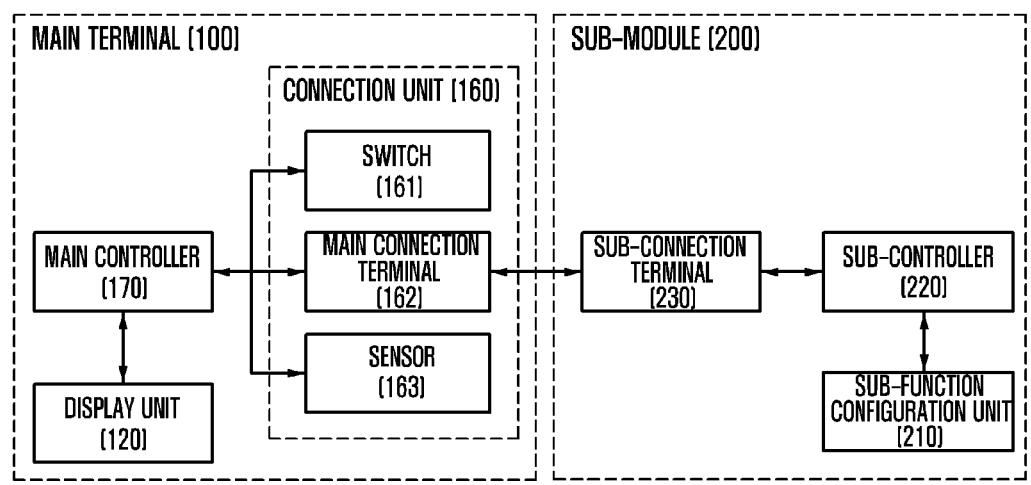
FIG. 3 is a block diagram showing a control circuit of the mobile terminal having a detachable sub-module.

Referring to FIG. 1, a mobile terminal 1 having a detachable sub-module 200 includes a main terminal 100 having a display unit 120 (shown in FIG. 2A) at a front surface and a sub-module 200 having a sub-function configuration unit 210 (shown in FIG. 3).

Referring to FIG. 2A, the main terminal 100 includes a body 110, display unit 120, earpiece 130, camera unit 140, and mouthpiece 150. The body 110 of the main terminal 100 is formed generally in a bar type, and the display unit 120 is provided at a front surface of the main terminal 100. The display unit 120 performs a function of a user interface for outputting a desired screen to a user or for receiving an instruction by an interaction from a user. The display unit 120 uses a liquid crystal display (LCD), organic light emitting diodes (OLED), thin film transistor (TFT), electrophoretic, or laser induced thermal image (LITI) technology. The LCD is an electric device for changing various electrical information generated in various devices using a change of a transmittance of liquid crystal according to an applied voltage to visible information and delivering the visible information. Further, the OLED is a light emission organic material for emitting light using field emission phenomenon that emits light when a current flows to a fluorescent organic compound. It is preferable that the display unit 120 has a function of a touch screen in order to receive an instruction from a user. The display unit 120 outputs a screen necessary for operating the sub-module 200.

The main terminal 100 includes the earpiece 130 provided in an upper portion of the main terminal 100 to output a sound signal and the mouthpiece 150 provided in a lower portion of main terminal 100 to input a sound signal. The user can hear a sound signal through the earpiece 130 and input a sound signal through the mouthpiece 150. Further, the main terminal 100 may include a camera unit 140 for photographing a front subject or for performing audiovisual communication. The camera unit 140 of FIG. 2A is disposed at an upper portion of the main terminal 100. The camera unit 140 may have only a basic function for photographing a subject.

Referring to FIG. 2B, a connection unit 160 for coupling the sub-module 200 is formed at the rear surface of the main terminal 100. In order to stably affix the sub-module 200, the connection unit 160 has a concave groove formed at a predetermined depth from the rear surface of the main terminal 100. A magnet 164 is installed at one side surface of the connection unit 160, and the sub-module 200 is coupled to the main terminal 100 or detached from the main terminal 100 through the magnet 164. FIG. 2B shows an exemplary embodiment in which the magnet 164 is installed at a circumferential edge forming the outer surface of the connection unit 160. The installation position and the quantity of the magnet 164 are not limited thereto and can be changed. Further, the magnet 164 may be installed at one side surface of the sub-module 200. In this exemplary embodiment, the mobile terminal 1 having a detachable sub-module 200 simplifies the structure of the mobile terminal 1 by coupling the main terminal 100 and the sub-module 200 using the magnet 164.

The main terminal 100 includes a sensor 163 for detecting whether the sub-module 200 is coupled to the main terminal 100. As shown in FIG. 2B, the sensor 163 is installed at one side surface of the connection unit 160 through which the main terminal 100 and the sub-module 200 are coupled. The sensor 163 outputs a signal to a main controller 170 according to whether the sub-module 200 is coupled to the main terminal 100. Further, a switch 161 for selecting whether the sub-module 200 operates or not is installed at the connection unit 160. As shown in FIG. 2B, by selecting the mode of the switch 161, the sub-module 200 may be operated (SYNC state) or may not be operated (OFF state). The switch 161 shown in FIG. 2B is illustrative and can be changed. Further, a main connection terminal 162 for transmitting and receiving a control signal between the main terminal 100 and the sub-module 200 is installed at the connection unit 160.

Although not shown, a key input unit for receiving a manipulation instruction from a user may be positioned at an upper surface or at a side surface of the main terminal 100. As described above, when the display unit 120 has a touch screen function, the key input unit is formed with function keys for receiving an input from a user, such as turning the power on or off of the mobile terminal 1. The key input unit may be a keypad or a key button.

As shown in FIG. 2A and FIG. 2B, it is preferable that the main terminal 100 is generally a bar type mobile terminal 1 having the display unit 120 with a touch screen at a front surface. However, the form of the main terminal 100 is not limited thereto, and the main terminal 100 can have various formats of mobile terminal 1 such as a slide type, flip type, folder type, and rotating type.

In the present exemplary embodiment, the sub-module 200 is a separate electronic device that can be attached to the main terminal 100 in order to extend various functions of the mobile terminal 1. The sub-module 200 includes a sub-function configuration unit 210 formed with parts for performing a function requested by a user. A plurality of sub-modules 200 can be provided according to desired functionality of the mobile terminal 1. FIG. 1 shows a camera module 300 for supporting high-quality photography of a subject and a beam projector module 400 that can be conveniently transported and used in numerous environments. The sub-module 200 cannot be individually operated, is coupled to the main terminal 100 through the connection unit 160 formed at a rear surface of the main terminal 100, and receives a control signal from the main terminal 100 in order to perform a function. As shown in FIG. 1, each sub-module 200 has a section of a complimentary shape to the shape of the connection unit 160 so that the sub-module 200 can be coupled to the connection unit 160 of the main terminal 100. Further, a magnet 164 may be installed along the outer side of the sub-module 200.

Although not shown, a first electronic circuit board and a second electronic circuit board may be installed within the main terminal 100 and the sub-module 200, respectively. The first electronic circuit board and the second electronic circuit board have a thin plate shape and include various electronic parts and wirings for connecting the electronic parts. Preferably, the electronic circuit boards use printed circuit boards (PCB). The display unit 120 provided in the main terminal 100 and the sub-function configuration unit 210 provided in the sub-module 200 receive an electrical signal from the first electronic circuit board and the second electronic circuit board, respectively, to perform a corresponding function.

The first electronic circuit board and the second electronic circuit board can be embodied in various software modules (not shown) for controlling operations and functions of the mobile terminal 1 and the sub-module 200. The software module may include a control circuit for controlling operation of the display unit 120 and the sub-function configuration unit 210.

FIG. 3 is a block diagram showing a control circuit of the mobile terminal having a detachable sub-module of FIG. 1. Referring to FIG. 3, the main terminal 100 includes a main controller 170 for controlling a screen output of the display unit 120, and the sub-module 200 includes a sub-controller 220 for controlling operation of a sub-function configuration unit 210.

The main controller 170 receives a user's manipulation instruction from the display unit 120 or receives an output signal from the sensor 163 to control screen output of the display unit 120. When the sub-module 200 is coupled to the main terminal 100, the main controller 170 outputs a control signal to the sub-controller 220 for controlling operation of the sub-function configuration unit 210. Further, the sub-controller 220 may output a control signal for controlling a screen output of the display unit 120 to the main controller 170 according to operation of the sub-function configuration unit 210.

The main terminal 100 and the sub-module 200 include a main connection terminal 162 and a sub-connection terminal 230, respectively. The main controller 170 and the sub-controller 220 transmit and receive control signals for controlling screen output of the display unit 120 and operation of the sub-function configuration unit 210 through the main connection terminal 162 and the sub-connection terminal 230. As the sub-module 200 is coupled to the main terminal 100 and the main connection terminal 162 and the sub-connection terminal 230 contact, the control signal can be transmitted and received.

Operation of the mobile terminal 1 having a detachable sub-module 200 according to an exemplary embodiment of the present invention is described hereinafter with reference to FIGS. 4 to 6C.

Figure 4:
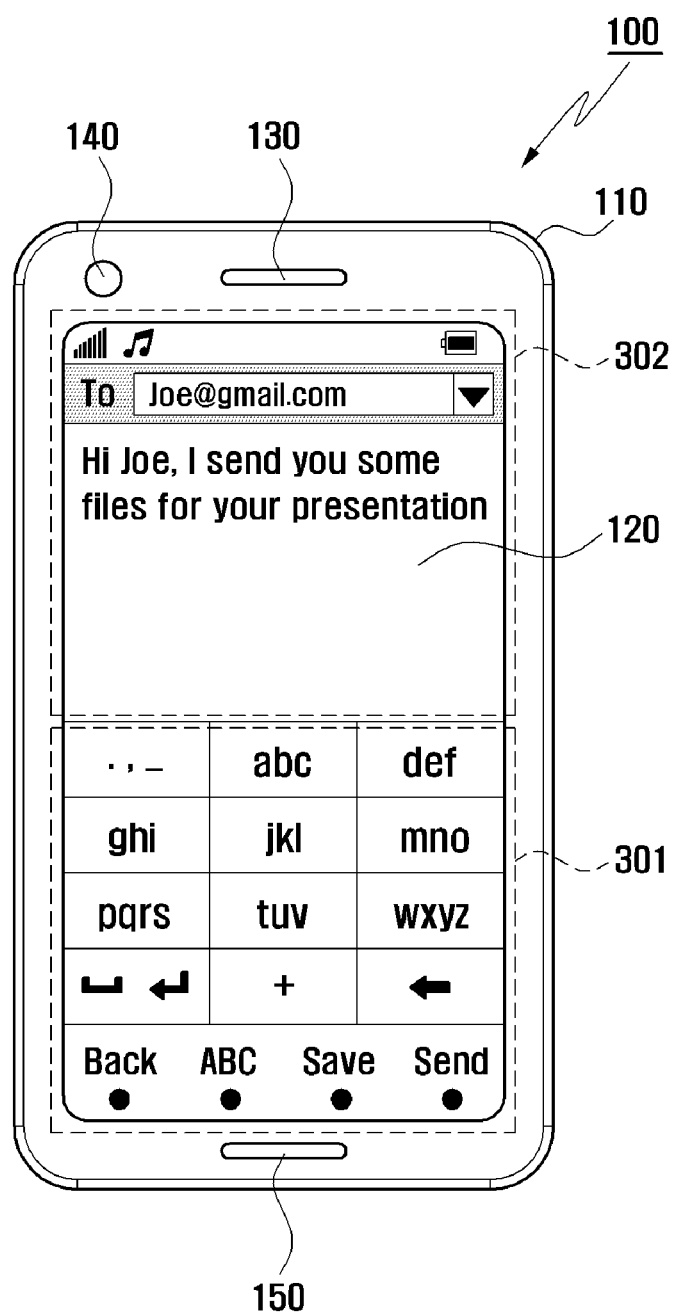
FIG. 4 is a view showing an exemplary embodiment of using only a main terminal of the mobile terminal having a detachable sub-module.

FIG. 4 shows use of the main terminal 100 during which a desired operation is performed with only the display unit 120 with the sub-module 200 unnecessary for performing the function. As described above, the user may use only the main terminal 100 of the mobile terminal 1. The user can set use of only the main terminal 100 through the display unit 120. Alternatively, the mobile terminal 1 determines whether the sub-module 200 is coupled to the main terminal 100 through the sensor 163 installed at the connection unit, and the user may use only the main terminal 100 when the sub-module 200 is not coupled to the main terminal 100. In this case, the main controller 170 controls the mobile terminal 1 with user requests entered using only the display unit 120.

FIG. 4 shows an exemplary embodiment of writing a message using the display unit 120 of the main terminal 100. Referring to FIG. 4, the main controller 170 controls screen output of the display unit 120 so that an upper portion of a full screen of the display unit 120 displays message content in the input window 302, and a lower portion of the display unit 120 displays a touch keypad 301 for inputting characters by a user. Therefore, the user inputs and sends a message using the touch keypad 301 displayed in the lower portion of the display unit 120. When a desired operation may be performed with only the display unit 120 of the main terminal 100, i.e., the sub-module 200 is unnecessary for performing a function, the user may transport only the main terminal 100, thereby increasing the portability quality of the mobile terminal 1.

When the user uses the sub-module 200 for performing a function, the user can set use of the main terminal 100 and the sub-module 200 through the display unit 120. Alternatively, the mobile terminal 1 determines whether the sub-module 200 is coupled to the main terminal 100 through the sensor 163 installed at the connection unit 160 of the main terminal 100, and the user may use the sub-module 200 when it is coupled to the main terminal 100. In this case, the user sets the mode of switch 161, for example, to the SYNC state in order to operate the sub-module 200.

The main controller 170 outputs a control signal for controlling operation of the sub-function configuration unit 210 to the sub-controller 220 while controlling screen output of the display unit 120. The sub-controller 220 receives a control signal from the main controller 170 to control operation of the sub-function configuration unit 210.

Figure 5A:
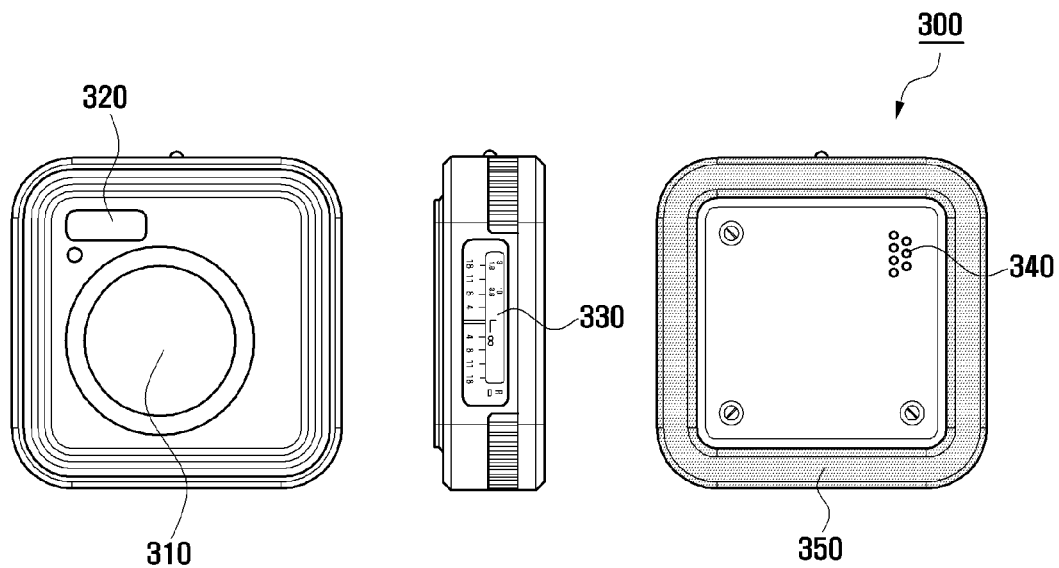
FIG. 5A is a view showing a camera module as an exemplary embodiment of a sub-module in the mobile terminal having a detachable sub-module.
Figure 5B:
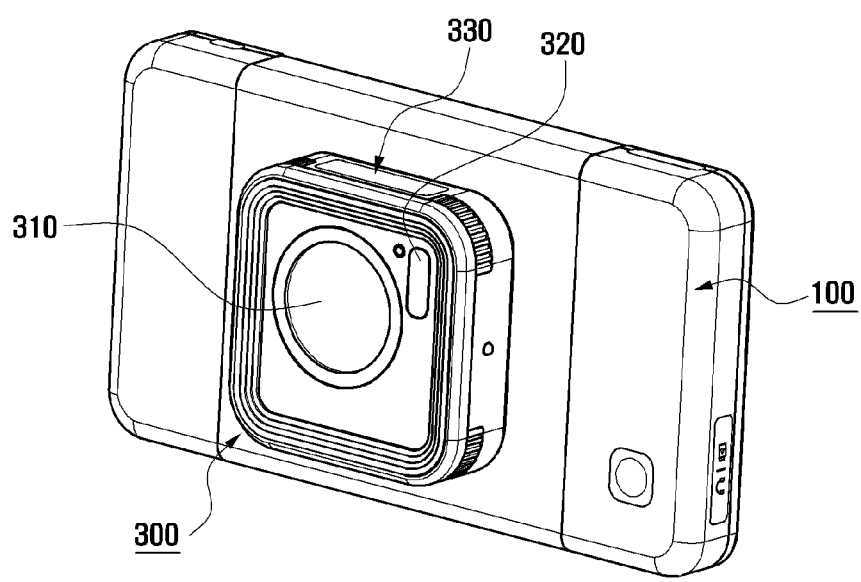
FIG. 5B is a perspective view showing an exemplary embodiment in which a camera module is mounted in a connection unit of a main terminal in the mobile terminal of FIG. 1.
Figure 5C:
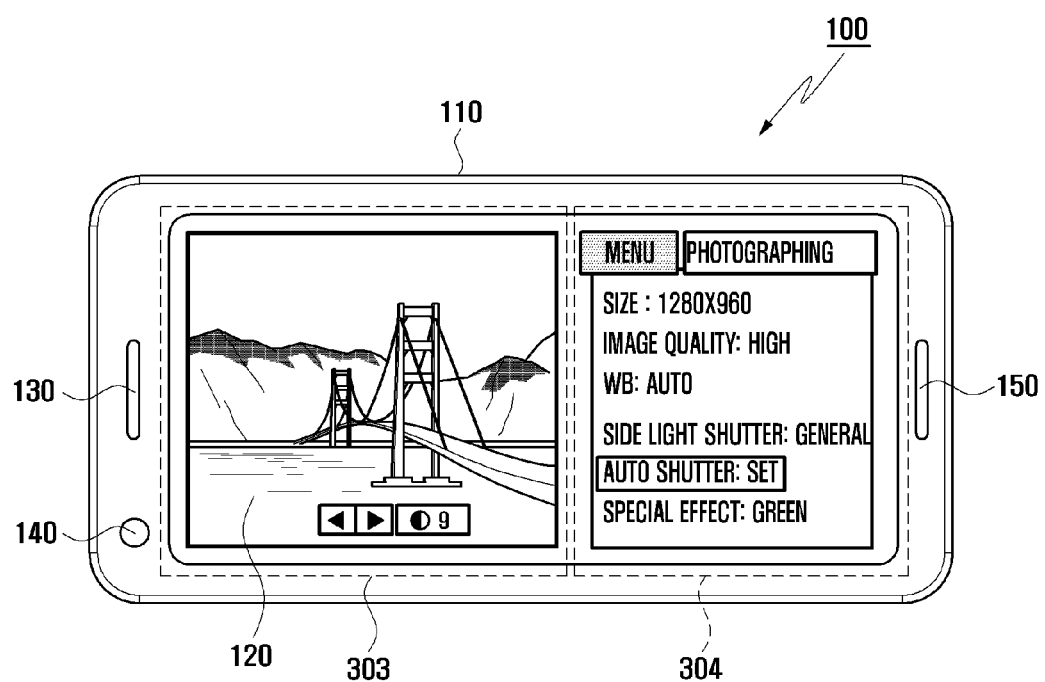
FIG. 5C is a view showing an exemplary embodiment of manipulating a camera module through a main display unit in the mobile terminal of FIG. 1.

FIG. 5A shows a camera module 300 as an example of a sub-module 200. FIG. 5B is a perspective view showing an exemplary embodiment of the present invention in which the camera module 300 is mounted in the connection unit 160 of the main terminal 100. FIG. 5C shows an exemplary embodiment of the present invention for manipulating a function of a camera module through the main display unit 120 of the mobile terminal 1.

Referring to FIG. 5A, the camera module 300 has a lens unit 310 and a lighting unit 320 at a front surface, a magnification display unit 330 for displaying a zoom magnification element at a side surface, and a sub-connection terminal 340 at a rear surface that electrically connects to the main connection terminal 162 of the main terminal. Further, a section of the rear surface of the camera module 300 may have a complimentary shape to that of the connection unit 160 of the main terminal 100, and a magnet 350 may be installed along the outer side of the camera module 300. Although not shown, the camera module 300 includes an image sensor for converting a detected image of a subject transmitted through the lens unit 310 to an electrical image signal. The image sensor includes a CMOS sensor for converting an image signal of a subject transmitted through the lens unit 310 to an electrical signal, an analog/digital converter for converting an electrical analog signal to a digital signal, and a digital signal processor (DSP) for receiving a digital signal converted by the analog/ digital converter to process the image signal. The lens unit 310, lighting unit 320, magnification display unit 330, and image sensor are the sub-function configuration unit 210 of the camera module 300 and are controlled through the sub-controller 220 of the camera module 300.

Referring to FIG. 5B, the camera module 300 is coupled to the connection unit 160 of the main terminal 100 through a rear surface. When the camera module 300 is coupled to the main terminal 100, the main connection terminal 162 of the main terminal 100 and the sub-connection terminal 340 of the camera module 300 contact, establishing an electrical connection.

When the camera module 300 is coupled to the main terminal 100, the main controller 170 outputs a screen necessary for operating the camera module 300 to the display unit 120. FIG. 5C illustrates an example of a screen when photographing a front subject using the camera module 300. The user can perform a desired operation by inputting a manipulation instruction through the display unit 120. For example, the user may view an image 303 of a subject displayed in the display unit 120, set a photographing option through a menu 304, and photograph the subject. When the user inputs a specific manipulation instruction through the display unit 120, the main controller 170 outputs a control signal corresponding to the manipulation instruction to the sub-controller 220 of the camera module 300 through the main connection terminal 162. The sub-controller 220 receives a control signal to control parts of the sub-function configuration unit 210 such as the lens unit 310, lighting unit 320, or magnification display unit 330. For example, when the user selects an automatic shutter function through the menu 304 displayed in the display unit 120, the sub-controller 220 controls the lighting unit 320 so that the camera module 300 performs an automatic shutter operation. When the camera module 300 is separated from the main terminal 100, the main controller 170 controls the display unit 120 to display an initial screen of the main terminal 100. A screen of the display unit 120 shown in FIG. 5C is an exemplary embodiment, and the display unit 120 can display various screens when using the camera module 300.

Figure 6A:
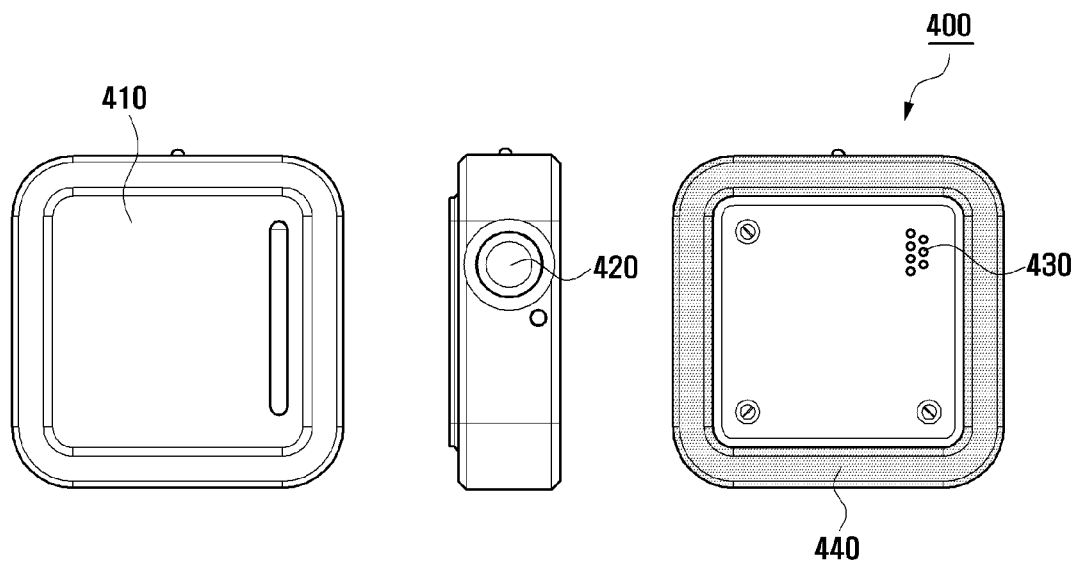
FIG. 6A is views of an exemplary embodiment showing a beam projector module as a sub-module in the mobile terminal having a detachable sub-module.
Figure 6B:
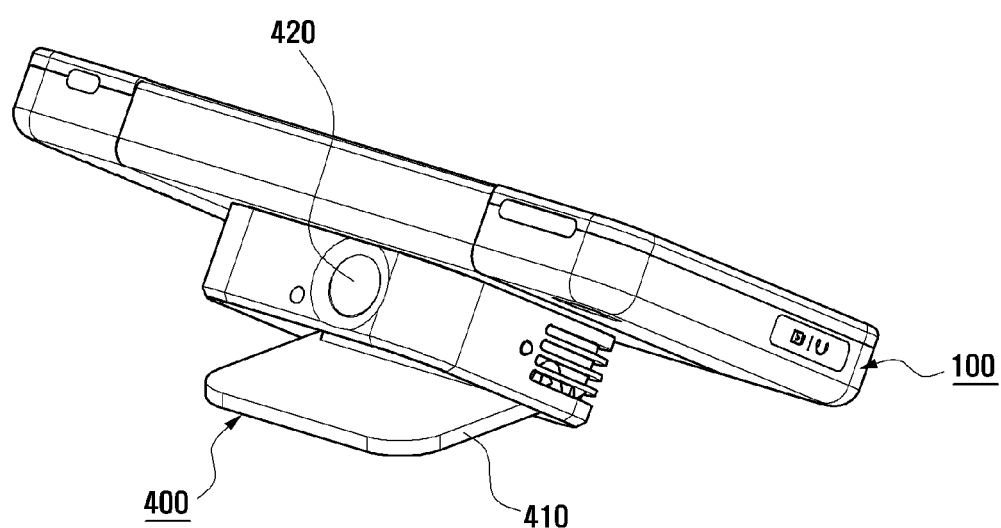
FIG. 6B is a view of an exemplary embodiment showing beam projector module mounted in a connection unit of a main terminal in the mobile terminal of FIG. 1.
Figure 6C:
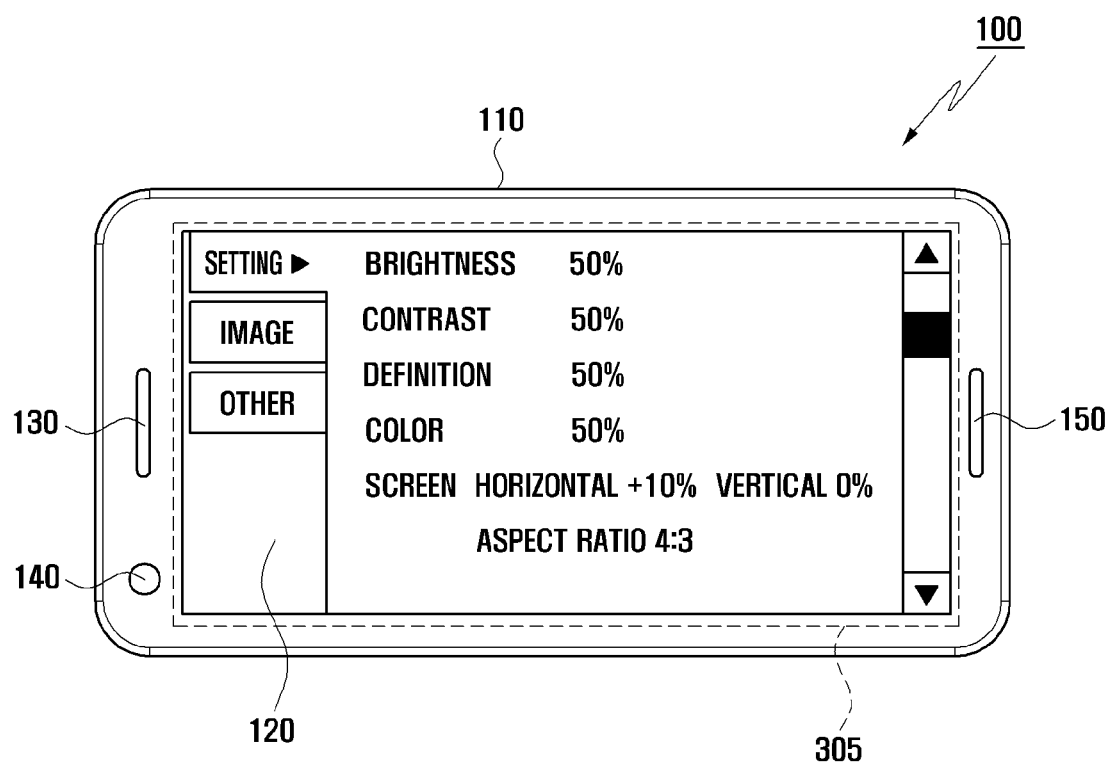
FIG. 6C is a view of an exemplary embodiment showing manipulation of a beam projector module through a main display unit in the mobile terminal of FIG. 1.

FIG. 6A shows various views of a beam projector module 400 as an exemplary embodiment of a sub-module 200. FIG. 6B shows a perspective view of an exemplary embodiment in which a beam projector module 400 is mounted to the connection unit 160 of the main terminal 100 of the mobile terminal 1. FIG. 6C shows an exemplary embodiment of manipulating a beam projector module 400 through the main display unit 120.

Referring to FIG. 6A, the beam projector module 400 has a support 410 at a front surface, a projecting lens unit 420 at a side surface for magnifying and projecting an image to an external screen (not shown), and a sub-connection terminal 430 at a rear surface to electrically connect the beam projector module 400 to the main connection terminal 162 of the main terminal 100. Further, a section of the rear surface of the beam projector module 400 may have a complimentary shape to the shape of the connection unit 160 of the main terminal 100, and a magnet 440 may be installed at the outer side of the beam projector module 400. The beam projector module 400 may include an image projecting unit (not shown) for emitting a high intensity light source in order to project an image transmitted from the main terminal 100 to an external screen. The projecting lens unit 420 and the image projecting unit are the sub-function configuration unit 210 of the beam projector module 400 and are controlled through the sub-controller 220 of the beam projector module 400.

Referring to FIG. 6B, the beam projector module 400 is coupled to the connection unit 160 of the main terminal 100 through a rear surface. When the beam projector module 400 is coupled to the main terminal 100, the main connection terminal 162 of the main terminal 100 and the sub-connection terminal 430 of the beam projector module 400 contact, establishing an electrical connection.

When the beam projector module 400 is coupled to the main terminal 100, the main controller 170 outputs a screen necessary for operating the beam projector module 400 to the display unit 120. FIG. 6C shows an exemplary embodiment of the present invention of a screen for setting a use option of the beam projector module 400. The user may set through a screen 305 various use options such as brightness, contrast, definition, and screen position of an image projected. When the user sets a use option through the display unit 120, the main controller 170 outputs a control signal corresponding to the use option to the sub-controller 220 of the beam projector module 400 through the main connection terminal 162. The sub-controller 220 receives a control signal to control the projecting lens unit 420 and the image projecting unit. When the beam projector module 400 is separated from the main terminal 100, the main controller 170 controls the display unit 120 to display an initial screen of the main terminal 100. The screen of the display unit 120 shown in FIG. 6C is an exemplary embodiment, and various screens are possible.

As described above for the mobile terminal 1 having a detachable sub-module 200, by coupling the sub-module 200 for performing a function to the main terminal 100 having the display unit 120, various functions of the mobile terminal 1 are supported. Further, because some operations can be performed with only the display unit 120 of the main terminal 100 without the use of the sub-module 200, only the main terminal 100 need be carried, thereby increasing the portability of the mobile terminal 1. Furthermore, the structure of the mobile terminal 1 is simplified by coupling with a magnet 164 a sub-module 200 for performing a specific function to the main terminal 100.

Further, by coupling a sub-module 200 for performing a specific function to a main terminal 100 having a display unit 120, various functions of the mobile terminal 1 are supported.

Additionally, when a desired operation can be performed with only the display unit 120 of the main terminal 100, i.e., a sub-module 200 for performing a specific function is unnecessary, only the main terminal 1 need be transported, enhancing the portability of the mobile terminal 1.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
    at least one sub-module comprising:
        a sub-function configuration unit comprising parts configured to perform a function, the sub-function configuration unit being configured to receive at least one control signal associated with performing the function, and
        a sub-controller configured to control operation of the sub-function configuration unit; and
    a main terminal comprising:
        a display unit at a front surface of the main terminal,
        a connection unit at a rear surface of the main terminal, the connection unit being configured to detachably couple the sub-module in at least electrical communication with the main terminal, and a main controller configured to control a screen output of the display unit and, if the sub-module is coupled to the main terminal, transmit and receive one or more control signals to control a screen output of the display unit and to control operation of the sub-function configuration unit via the sub-controller, wherein a magnet is disposed at a side surface of the connection unit or the sub-module, and the magnet is configured to detachably couple the sub-module in at least mechanical communication with the main terminal.

2. The mobile terminal of claim 1, wherein the connection unit comprises a sensor configured to detect whether the sub-module is coupled to the main terminal.

3. The mobile terminal of claim 2, wherein the connection unit further comprises a switch configured to select an operational mode of the sub-module.

4. The mobile terminal of claim 1, wherein the main terminal and the sub-module further comprise a main connection terminal and a sub-connection terminal, respectively, and wherein the one or more control signals are enabled to be transmitted and received when the main connection terminal and the sub-connection terminal are in contact.

5. The mobile terminal of claim 1, wherein the main controller is further configured to control the display unit to display a menu screen comprising one or more functions, and wherein, in response to an input operation performed via the menu screen, the sub-controller is further configured to receive at least one control signal to control the sub-function configuration unit corresponding to at least one control signal generated by the main controller.

6. The mobile terminal of claim 1, wherein the sub-module comprises a camera module.

7. The mobile terminal of claim 1, wherein the sub-module comprises a beam projection module.

8. The mobile terminal of claim 1, wherein the display unit comprises a liquid crystal display (LCD) or an organic light emitting diode (OLED).

9. The mobile terminal of claim 1, wherein the display unit comprises a touch screen.

10. The mobile terminal of claim 1, wherein at least one of the main terminal and the sub-module further comprises a key input unit.

11. A mobile terminal, comprising:
a sub-module comprising a sub-function configuration unit comprising parts configured to perform a function; and
a main terminal comprising:
a display unit on a front surface,
a connection unit on a rear surface, the connection unit comprising a first feature configured to detachably receive the sub-module, and
a main controller configured to, if reception of the sub-module is detected, determine the function associated with the sub-module and control a screen output of the display unit based on the determined function.

12. The mobile terminal of claim 11, wherein the sub-module comprises a front surface and a rear surface, the rear surface comprising a second feature configured to detachably couple to the first feature of the main terminal.

13. The mobile terminal of claim 12, wherein at least one of the first feature and the second feature comprises a magnet, and the sub-module is detachably coupled to the main terminal by a magnetic force.

14. The mobile terminal of claim 12, wherein the first feature further comprises a sensor configured to detect whether the sub-module is coupled to the main terminal.

15. The mobile terminal of claim 14, wherein the sub-module further comprises a sub-controller configured to control operation of the sub-function configuration unit, and wherein the main controller is further configured to, if the sub-module is coupled to the main terminal, transmit and receive one or more control signals to control operation of the sub-function configuration unit via the sub-controller.

16. The mobile terminal of claim 11, wherein the sub-module further comprises a front surface and a rear surface, the rear surface comprises a second feature, and the second feature comprises a shape that is complementary to a shape of the first feature of the main terminal, and wherein the first feature and the second feature detachably engage via the complimentary shapes.

17. The mobile terminal of claim 11, wherein the sub-module comprises a camera module.

18. The mobile terminal of claim 17, wherein the camera module comprises a lens and a light source.

19. The mobile terminal of claim 11, wherein the sub-module comprises a projector module.

20. The mobile terminal of claim 11, wherein the main terminal further comprises at least one wireless communication module configured to enable wireless communication over at least one wireless communication network.

21. The mobile terminal of claim 20, wherein the main terminal further comprises a camera unit disposed on the front surface of the main terminal, the camera unit being configured to facilitate audiovisual communication over the at least one wireless communication network.

22. The mobile terminal of claim 11, further comprising:
a switch configured to enable selection of one or more operational modes of the sub-module.

23. The mobile terminal of claim 11, wherein the main terminal is further configured to determine, in response to at least one control signal received in association with the sub-module being detachably received by the main terminal, a type of the sub-module detachably received thereto, the type being one of a plurality of different types and the function being one of a plurality of different functions.

* * * * *